United States Patent [19]
Paumier et al.

[11] 3,881,436
[45] May 6, 1975

[54] WORKPIECE TRANSFER MECHANISM

[75] Inventors: Thomas B. Paumier; Joseph D. Bulso, Jr.; William R. Lewers, all of Canton, Ohio

[73] Assignee: Paumier, Inc., Canton, Ohio

[22] Filed: July 17, 1973

[21] Appl. No.: 380,071

Related U.S. Application Data

[62] Division of Ser. No. 126,860, March 22, 1971, Pat. No. 3,768,667.

[52] U.S. Cl. .................................. 113/115; 72/421
[51] Int. Cl. ............................................. B21d 43/10
[58] Field of Search ............ 72/421, 422, 426, 346, 72/348; 113/120 H, 7 R, 7 A, 115; 214/1 BB

[56] References Cited
UNITED STATES PATENTS

| | | | |
|---|---|---|---|
| 649,071 | 5/1900 | Paull et al. | 113/120 H |
| 1,987,101 | 1/1935 | Fabrice | 113/120 H |
| 3,011,464 | 12/1961 | Danly et al. | 72/422 |
| 3,430,782 | 3/1969 | Henkel | 214/1 BB |
| 3,432,042 | 3/1969 | Bautz et al. | 214/1 BB |
| 3,521,760 | 7/1970 | Wallis | 214/1 BB |
| 3,528,575 | 9/1970 | McCaughey | 214/1 BB |
| 3,768,667 | 10/1973 | Paumier et al. | 214/1 BB |

*Primary Examiner*—C. W. Lanham
*Assistant Examiner*—M. J. Keenan
*Attorney, Agent, or Firm*—Hamilton, Renner & Kenner

[57] ABSTRACT

An apparatus for transferring a plurality of rows of workpieces, such as cans and the like, laterally to a machine having a plurality of work stations at which the workpieces are gripped through a transverse motion and, while gripped, are transferred laterally to the successive stations. The movements are timed with, but not tied to, the working movement of the machine itself by a drive system of cams, gears and the like.

13 Claims, 18 Drawing Figures

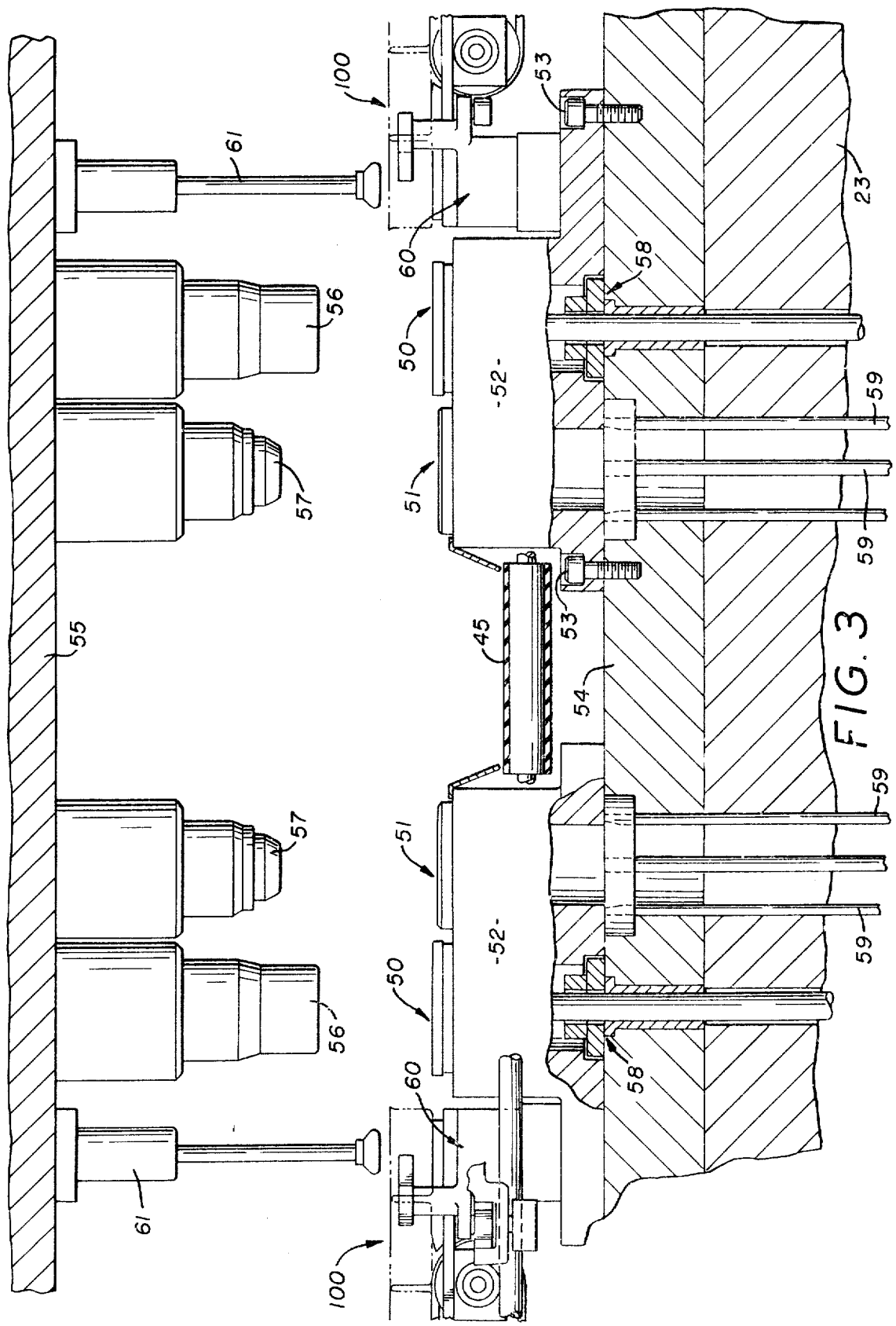

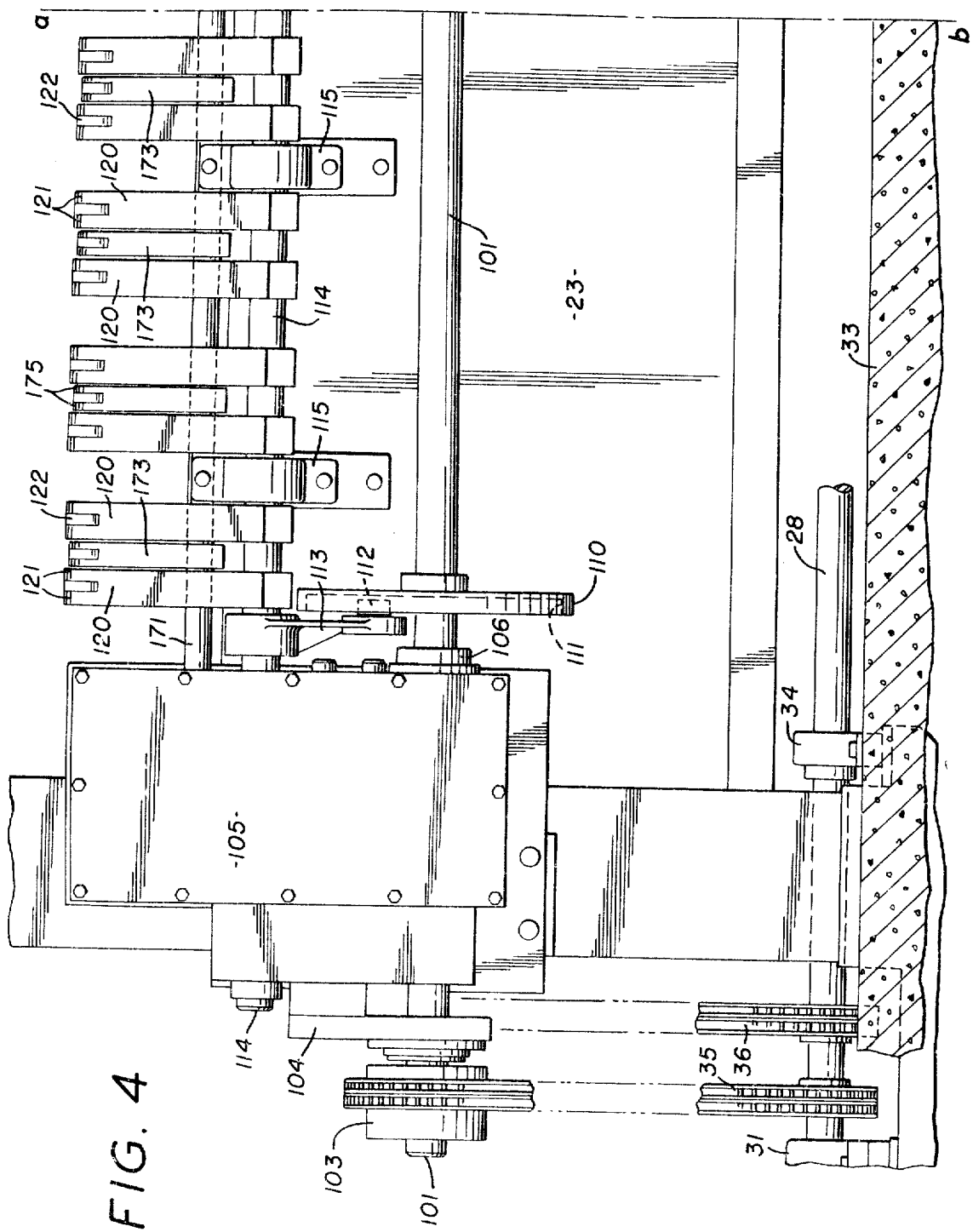

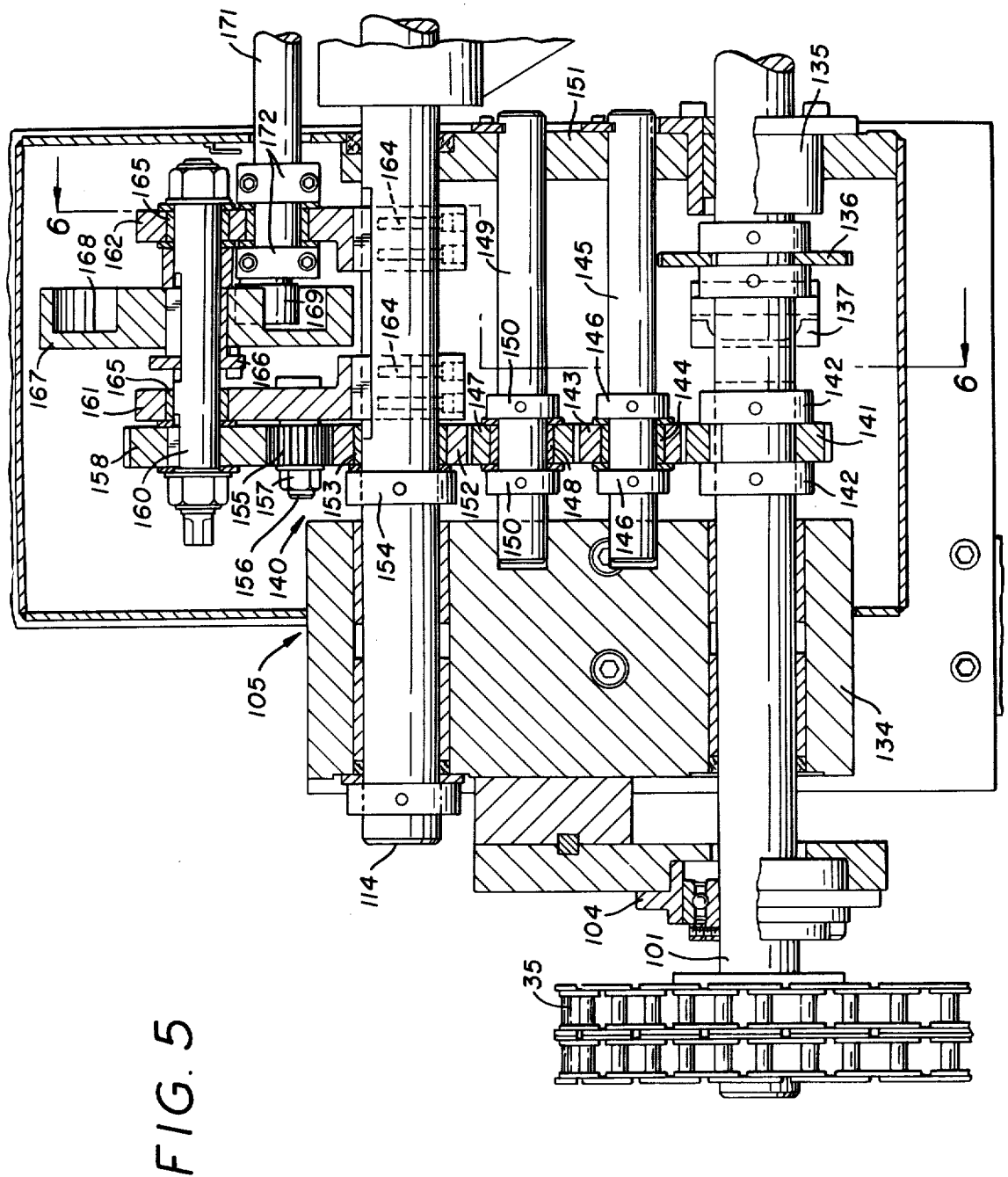

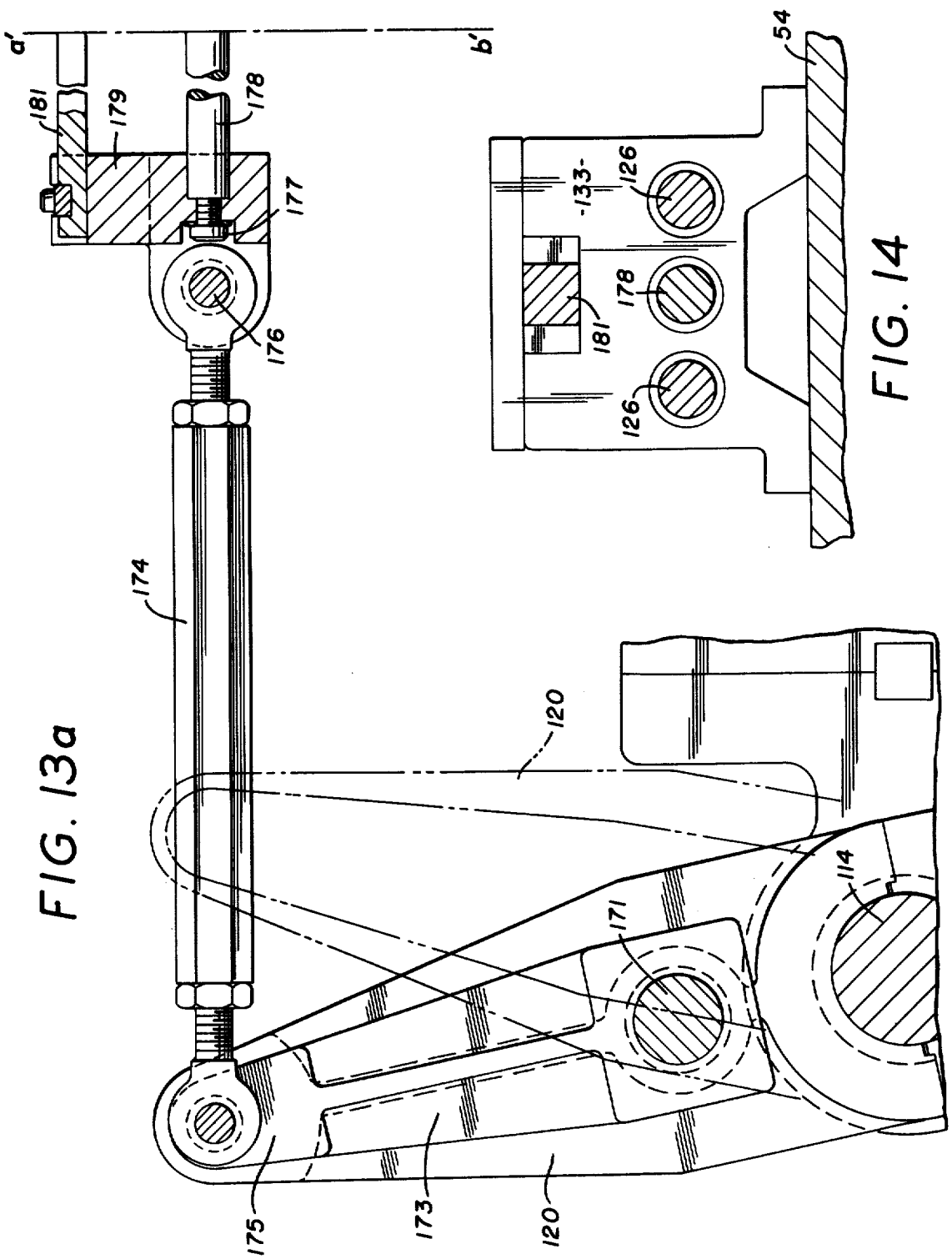

WORKPIECE TRANSFER MECHANISM

This is a Division of application Ser. No. 126,860, filed Mar. 22, 1971, now U.S. Pat. No. 3,768,667.

BACKGROUND OF THE INVENTION

This invention relates to a mechanism for the controlled transfer of workpieces in a manufacturing process. More particularly, this invention relates to a mechanism which transfers articles, such as partially drawn cans, to a second or redrawing press which has two or more stations therein, for example, one station for drawing the can into its final form and possibly a second station for the trimming of the drawn can into a usable form. The transfer mechanism of the present invention not only conveys the partially drawn cans step-by-step to the first station but at the same time also controls the transfer from the first to the second station within the redraw press.

In the manufacture of articles such as cans or the like, sheets of material, usually aluminum or some metallic alloy but often plastic, are stamped and drawn into a cup-like shape by a standard drawing press mechanism. These partially drawn articles are then conveyed to the input of a redraw press which, in one stroke, both draws the cup-like member into its final can shape and performs other functions such as trimming the excess flash-like areas from the can. While such a process is well established in the art of the manufacture of cans and the like, an adequate mechanism to receive the successive cans from the initial drawing press and present these cans to the draw, trim and other stations of the redraw press has remained an unsolved problem. If used for draw and trim stations, such transfer mechanisms must be capable of moving two cans (one from the input of the redraw press to the drawing station and the other from the drawing station to the trimming station) laterally, simultaneously. Further, the lateral movement into and out of the redraw press must be coordinated with a transverse movement of the can gripping members and with the downward movement of the press ram itself. The singly most flagrant shortcoming of the prior art is that no existing device, of which we are aware, has the capabilities of operating on multiple lines. Further, in many prior presses both the lateral and the transverse movement of the can gripping member are a slave to and therefore dependent upon the downward movement of the press.

For example, in one such design a rack and pinion type connection exists between the press stroke and the transfer mechanism. This is a very undesirable design because the lateral motion of the can gripping members is effected only at the time of the greatest speed of the press, with the gripping members being stopped suddenly when the ram is at the top and bottom of the stroke; that is, when the ram speed is zero. In fact, it is at that time (zero ram speed) when the transfer of cans into and out of the press is most desirable. Further, because of the stop-and-go nature of this transfer device, its operation is quite jerky and thus is incapable of operation at high speeds without a violent shock causing undue wear on vital parts, thus greatly shortening their life. The transverse or gripping motion of the can gripping members is likewise unacceptably uneven in this design with the motion again taking place while the ram is moving rather than while the ram is inactive or less active.

Another deficient prior art device creates the necessary lateral movement of the can gripping members by a reciprocating rocker cam driven by an eccentric on a crankshaft extension of the press. This design is advantageous over the device just described in that the time of the movement of the gripping members may be established at desirable points in the press stroke. However, because of the inherent rocking action, this design also has its limitations. For example, as the gripping members are transferred forward, that is, laterally toward the press, it is desirable that a rapid start and acceleration, smooth slowdown and smooth stop be accomplished. While this can be effected, it would be desirable that the same motion be accomplished on the return stroke; yet the opposite inherently occurs due to the design. While this device can operate more efficiently at speeds higher than the rack and pinion design, the transfer speed is nevertheless limited because of the erratic return motion.

The transverse or gripping motion of the reciprocating rocker cam device is usually controlled by a dog leg type of cam tied to the ram motor such that the downward motion of the ram spreads the gripping elements while the upward motion closes the gripping elements. This, too, has the basic shortcoming in that the motion is directly tied to the ram movement manifested in the fact that when operating at high speeds the gripping elements can not be moved together at the proper time to maintain complete control of the workpiece.

SUMMARY OF THE INVENTION

It is thus a primary object of the present invention to provide an apparatus which can transfer workpieces step-by-step to and within a machine, such as a redraw press, independently of any work operations in the machine.

It is likewise a primary object of the present invention to provide an apparatus, as above, which is capable of transferring multiple lines of workpieces to the machine.

It is another object of the present invention to provide an apparatus, as above, in which neither the lateral transfer movement to the redraw press nor the transverse gripping movement of the transfer mechanism is dependent on the stroke of the ram of the redraw press.

It is yet another object of the present invention to provide an apparatus, as above, in which the transfer and gripping movements can be timed to occur anywhere on the press stroke.

It is still another object of the present invention to provide an apparatus, as above, whose operation creates a flywheel effect giving a totally smooth operation.

It is a further object of the present invention to provide an apparatus, as above, which is capable of efficient operation at high speed.

It is a still further object of the present invention to provide an apparatus, as above, in which the drive mechanism creating the transverse or gripping motion of the transfer mechanism is carried with the lateral motion of the transfer mechanism, thereby effecting total workpiece control.

These and other objects of the present invention which will become apparent from the following description are accomplished by improvements hereinafter described and claimed.

In general, a transfer mechanism according to the present invention receives a plurality of lines of workpieces such as cans and the like from a pick-up station established by an escapement-like mechanism and moves them laterally to the first work station in a machine, such as a redraw press. At the same time, a can already at the first station is transferred to a second station. Similar simultaneous action occurs throughout a plurality of parallel stations dependent on the number of stations being utilized. With the cans in their proper position at the various stations, the gripping mechanism moves transversely to release the cans and then laterally retreats to its gripping position to pick up and transfer the next set of cans.

A series of rocker arms which carry the transfer mechanism effect the lateral or transfer movement, being connected to a reciprocating rocker shaft. The reciprocating motion is derived through a cam follower connection with a cam plate that rotates 360°. A second rotary cam plate which reciprocates with the rocker arms effecting the lateral movement drives a gear rack which, in turn, drives an eccentric pinion to effect the transverse or gripping motion. The two motions are coordinated with each other and with the stroke of the press, and have the capabilities of being independently adjustable to occur at any point within the press cycle. The motions, however, are not a slave to the position of the press ram.

BRIEF DESCRIPTION OF THE DRAWINGS

FIG. 3 is a sectional view taken substantially along line 3—3 of FIG. 2.

FIGS. 4 and 4a, on two sheets, comprise a view taken substantially along line 4—4 of FIG. 1, line a–b of FIG. 4 joining with line a'–b' of FIG. 4a.

FIG. 5 is a sectional view taken substantially along line 5—5 of FIG. 1.

FIG. 9 is a sectional view taken substantially along line 9—9 of FIG. 4a.

FIGS. 10 and 10a, on two sheets, comprise an enlarged top plan view of a transfer mechanism according to the concept of the present invention the same as that shown on a smaller scale in FIG. 2, line a–b of FIG. 10 joining with line a'–b' of FIG. 10a.

FIG. 13 and 13a, on two sheets, are sectional views taken substantially along lines 13—13 and 13a—13a, respectively, of FIGS. 10 and 10a, respectively, line a–b of FIG. 13 joining with line a'–b' of FIG. 13a.

FIG. 14 is a sectional view taken substantially along line 14—14 of FIG. 11.

DESCRIPTION OF THE PREFERRED EMBODIMENT

Figure 1:
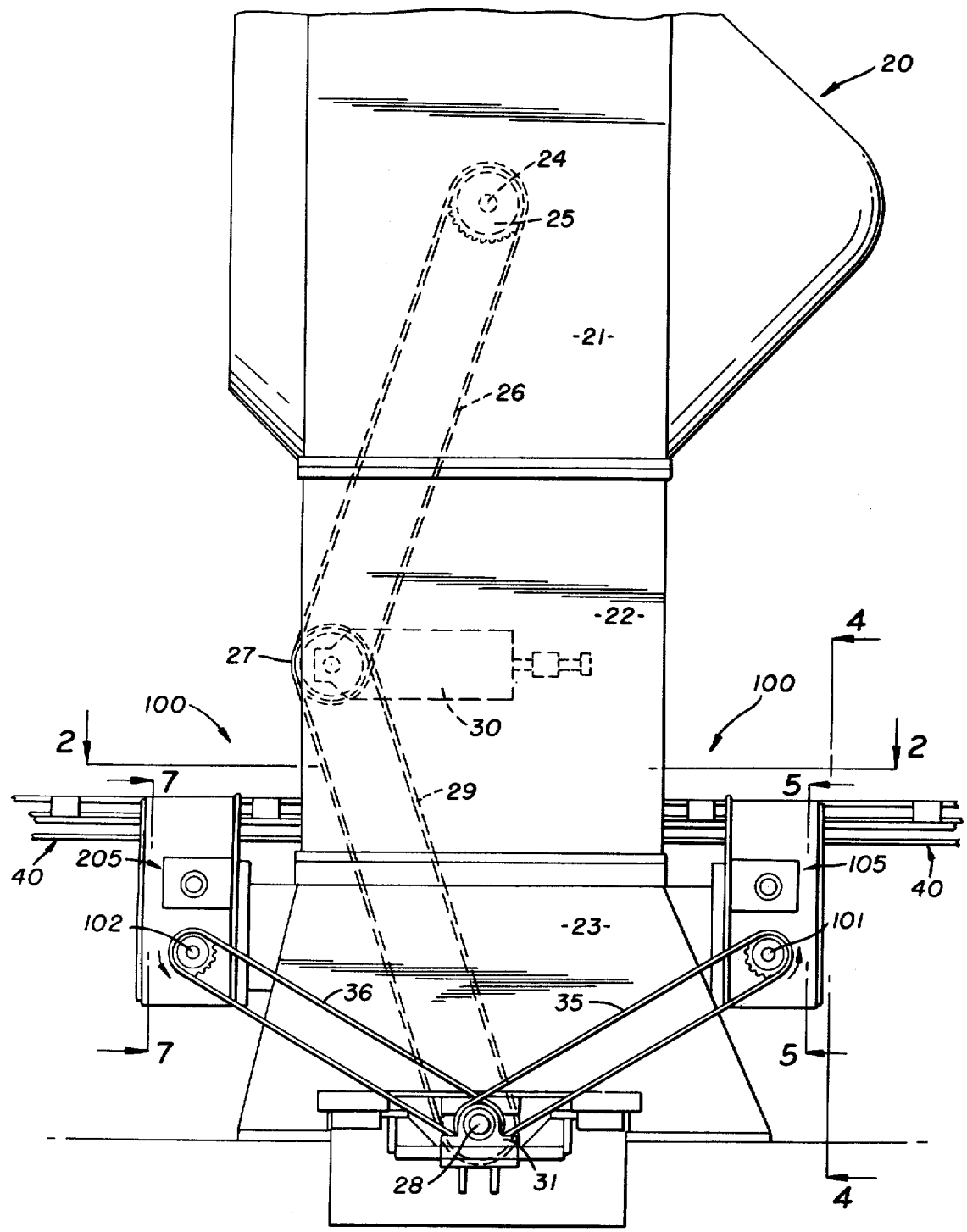
FIG. 1 is a schematic elevational view showing the transfer mechanism of the present invention in the environment of a redraw press.

A conventional press such as that used to redraw cans and the like is indicated generally by the numeral 20 in FIG. 1 and is shown somewhat schematically as having a crown or drive portion 21, a slide portion 22 and a base portion 23. A motor within drive portion 21 rotates shaft 24 which carries sprocket wheel 25 to, in turn, drive roller chain 26. Chain 26 is connected to one sprocket of a duo-sprocket take-up idler assembly 27, the second sprocket transferring the power to drive shaft 28 through chain 29. An adjustable take-up 30 allows the tension on chains 26 and 29 to be readily altered. Drive shaft 28 is supported at each end in a conventional manner, as by pillow blocks 31 and 32 and is spaced from the floor 33 by a series of bearing supports 34. Drive shaft 28 further rotates, via chains 35 and 36 the main drive shafts 101 and 102 of a dual transfer mechanism indicated generally by the numeral 100, to be hereinafter described in more detail.

Figure 2:
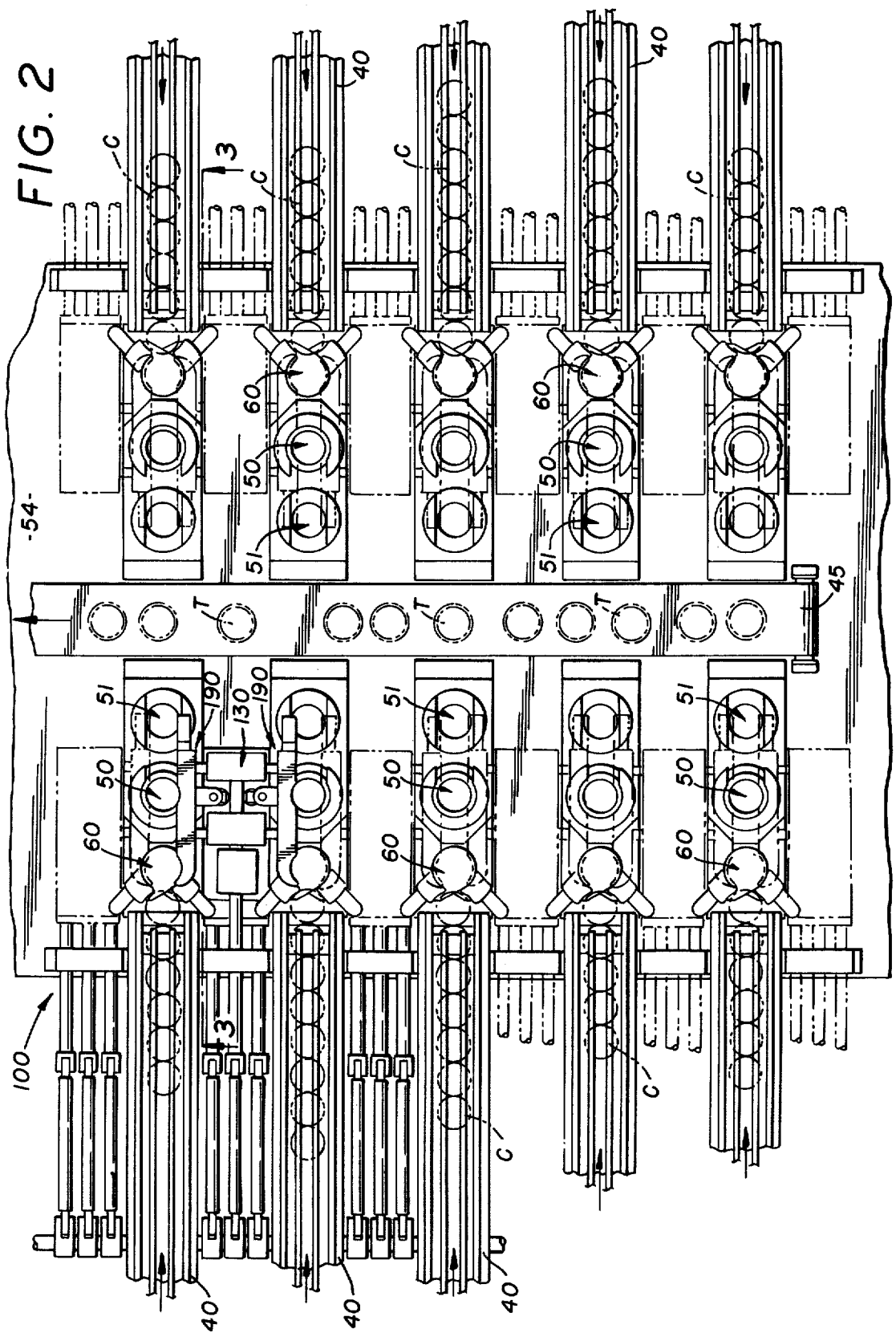
FIG. 2 is a top view taken substantially along line 2—2 of FIG. 1.

A series of conveyors 40 which bring workpieces, such as cups or first-operation drawn cans C, or the like, to the transfer mechanism 100 is best shown in FIG. 2. While five rows of conveyors 40 are shown as feeding into both sides of the press 20, it is evident that any number may be utilized, dependent on press capabilities. As will hereinafter be described, the partially drawn cans C are fed on the 10 conveyors 40 to escapement mechanisms 60 which hold the leading can C and locate it such that it may be picked up by the transfer mechanism 100.

The particular redraw press 20 shown is one having within its slide portion 22 two work stations for each line of cans C. As shown in FIGS. 2 and 3, the first station encountered by the cans C as they enter the press 20 is a redraw station 50. After being drawn from their cup-like form into a finished can shape, the cans C move to a trim station 51. The die assembly tooling 52, shown schematically in FIG. 3, for each station 50 and 51 is connected, as by bolts 53, to the bolster plate 54 which is held by the top of the base portion 23.

The press head or punch holder 55 is downwardly movable during press actuation and carries a cup holding device 61, to be hereinafter described in conjunction with the detailed description of the transfer mechanism 100; a drawing head 56 for each drawing station 50; and a trimming head 57 for each trimming station 51. When a cup is redrawn at station 50, it is pressed and formed within the tooling 52 and must be lifted out so that it can be transferred to the next station. For this purpose, the press 20 is provided with a conventional lift-out mechanism 58 which is activated at the proper moment to raise the drawn can out of the tooling 52. The can C is then transferred to the trimming station 51 and, as it is trimmed, it is discharged within guide bars 59 to a take-away conveyor or other discharge-like device below (not shown). The scraps of trimmed material T (FIG. 2) are pushed onto a take-away conveyor 45 located centrally of the press 20 by the transfer mechanism 100.

The apparatus described thus far is for the most part conventional in a redrawing press such as that manufactured by The Minster Machine Company, Minster, Ohio. As such, this press forms the environment for the transfer mechanism 100, the actuation and structure of which will now be described in detail.

Figure 4A:
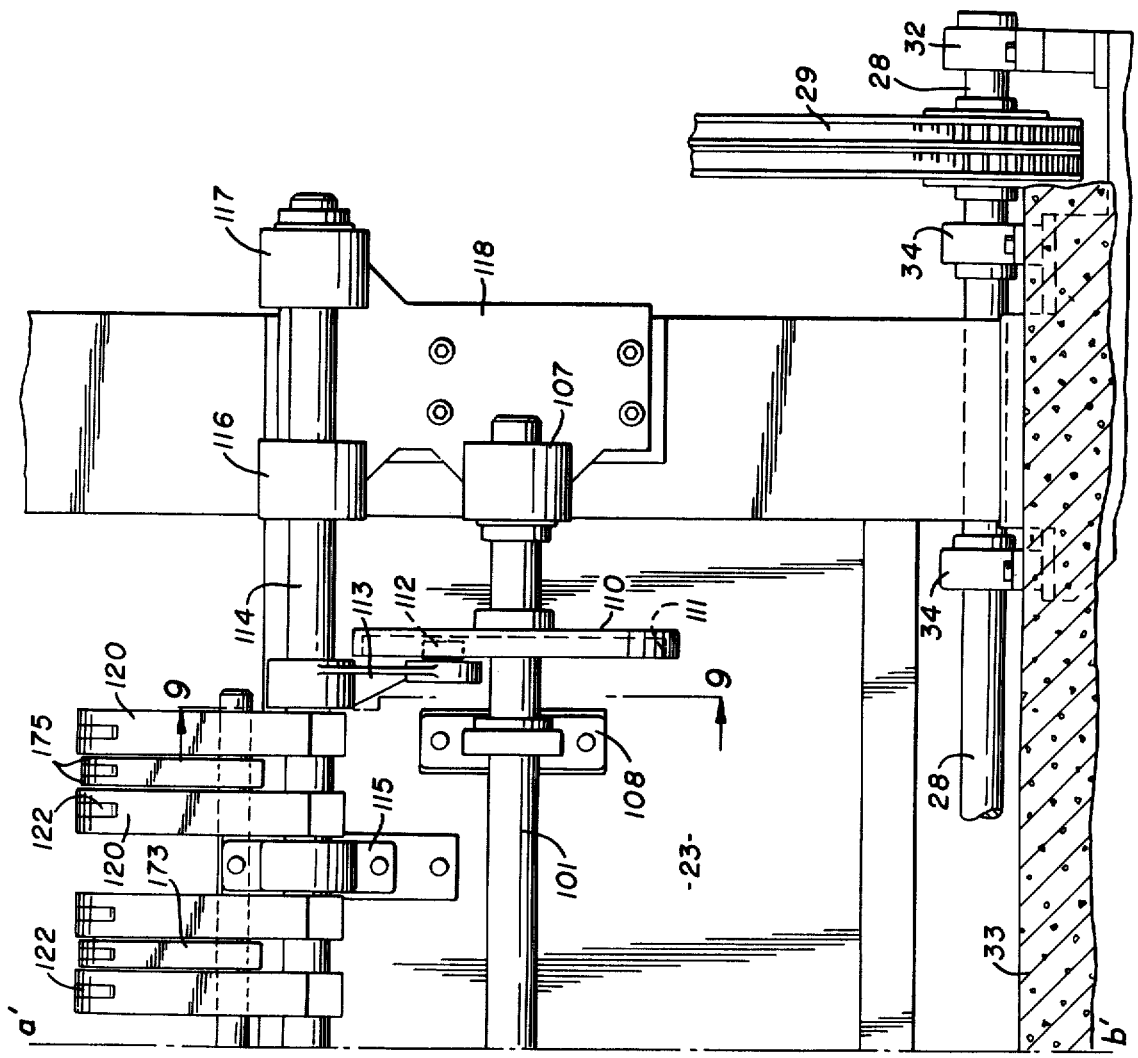

As previously described, and as best shown in FIGS. 4 and 5, the chain 35 drives the main shaft 101 of the transfer mechanism 100 by means of a sprocket assembly 103. Shaft 101 passes through a bearing collar 104, through a gear housing or box indicated generally by the numeral 105, and through further bearings 106, terminating at end bearing 107. Suitable support bearing brackets 108 may be provided along the length of shaft 101, as desired, brackets 108 being fixed, if convenient, to the press 20.

Figure 9:
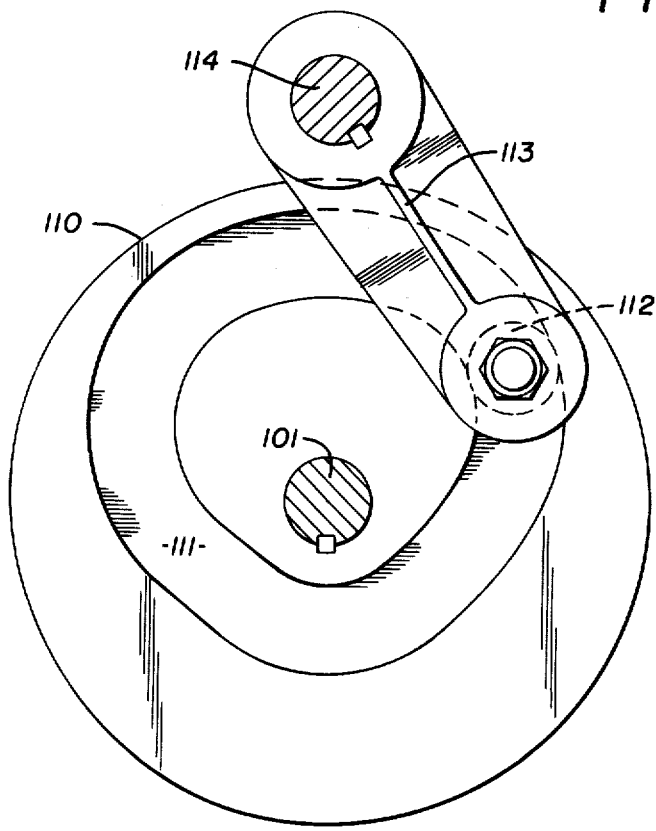

Fixed to opposite end portions of shaft 101 are two cam plates 110 having cam channels 111 therein (FIG. 9). Cam follower rollers 112 ride in channels 111 and are carried by arms 113 which are fixed to rocker shaft 114. As shown in FIG. 9, each cam channel 111 is designed such that the full rotary motion of cam plates 110 is transferred into an angularly reciprocating or rocking motion of rocker shaft 114. In the preferred embodiment, cam channels 111 are designed such that the shaft 114 rocks through an angle of about 24°. Like drive shaft 101, rocker shaft 114 may be suitably supported along its length as by bearing brackets 115 and pass through a conventional bushing 116 and end bearing 117. It should be noted that bushing 116 and end bearings 117 and 107 are all mounted on a bracket 118 which is fixed to the side of the press 20.

Figure 10:
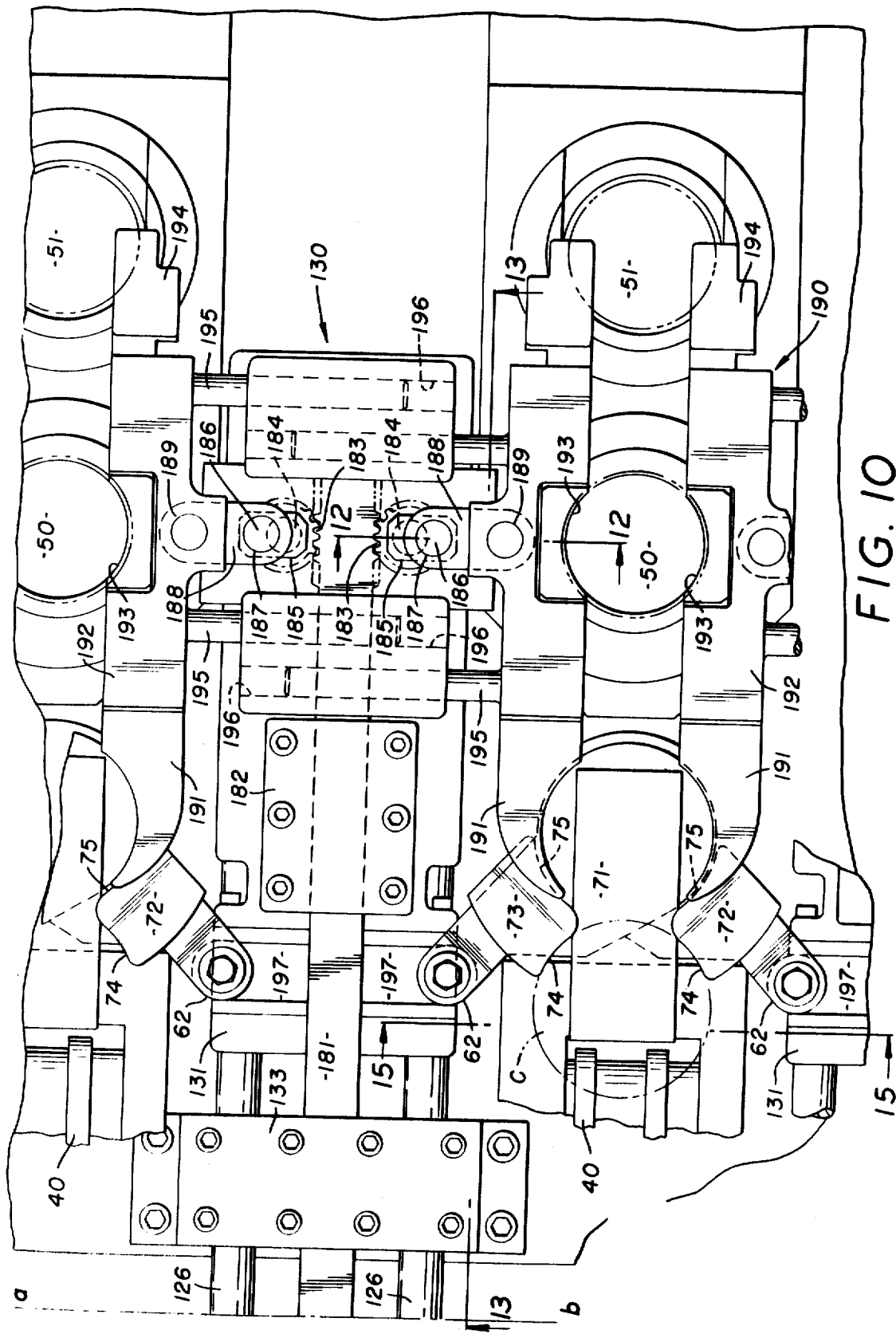
Figure 13:
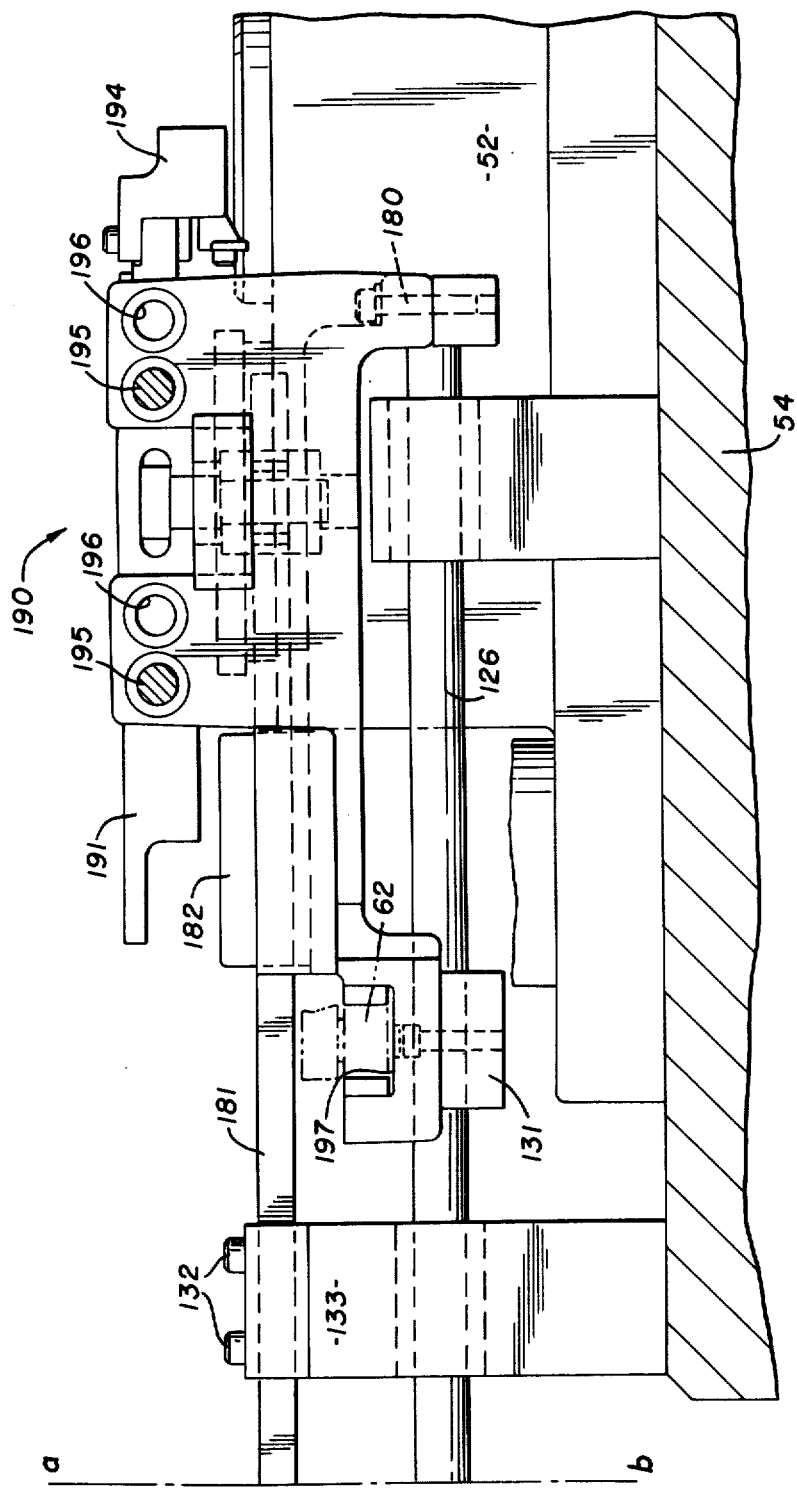

A plurality of throw arms or rocker arms 120 are mounted on rocker shaft 114 for arcuate reciprocation or oscillation therewith. Rocker arms 120 are provided in groups of two and afford lateral movement of the transfer mechanism 100 to and from the press 20. The top of each arm 120 terminates in a clevis-like structure 121 for connection with link arms 122 (FIG. 10a). Link arms 122 are likewise pinned, as at 123, to the clevis connection of clevis blocks 124, the base portion of which are attached, as by bolts 125, to rods 126 which carry, at their outer end, a shuttle carriage indicated generally by the numeral 130. Shuttle 130 (FIG. 10) is affixed to the ends of rods 126 in a clamping structure 131, as by bolts 132 and 180 (FIG. 13), with rods 126 passing through suitable bearing supports 133. It should thus be evident that the rocking of shaft 114, as driven by cam plate 110 on drive shaft 101, translates the shuttle carriage 130 of transfer mechanism 100 laterally to and from within the press 20.

In order to provide for the transverse or gripping movement of a portion of the transfer mechanism 100, the drive shaft 101 is, as previously described, fed through a gear box 105, the details of which are best shown in FIG. 5. Shaft 101 is structurally supported as by bearing block 134 and bushings 135, and drives an oil pump gear 136 which operates an oil pump 137 in a standard manner to provide an oil bath for the gear train indicated generally by the numeral 140, shown in more detail in FIG. 6.

A spur gear 141 is keyed to shaft 101 and confined in place by mounting collars 142. Gear 141 meshes with an intermediate spur gear 143 which rides on a bushing 144 on fixed stub shaft 145, being held by collar and washer assemblies 146. Spur gear 143, in turn, operates a second intermediate spur gear 147 which rides on a bushing 148 on fixed stub shaft 149, being held in place by collar and washer assemblies 150. Shafts 145 and 149 are mounted within bearing block 134 on one side and in the gear housing 105, itself, on the other side, with structural strength being afforded by plate 151.

Another intermediate spur gear 152 extends around rocker shaft 114 and rides on bushing 153, being held in place by collar and washer assembly 154. Spur gear 152 transfers the motion from gear 147 to a further intermediate spur gear 155 mounted on an axle 156 and held in place as by nut 157.

Figure 6:
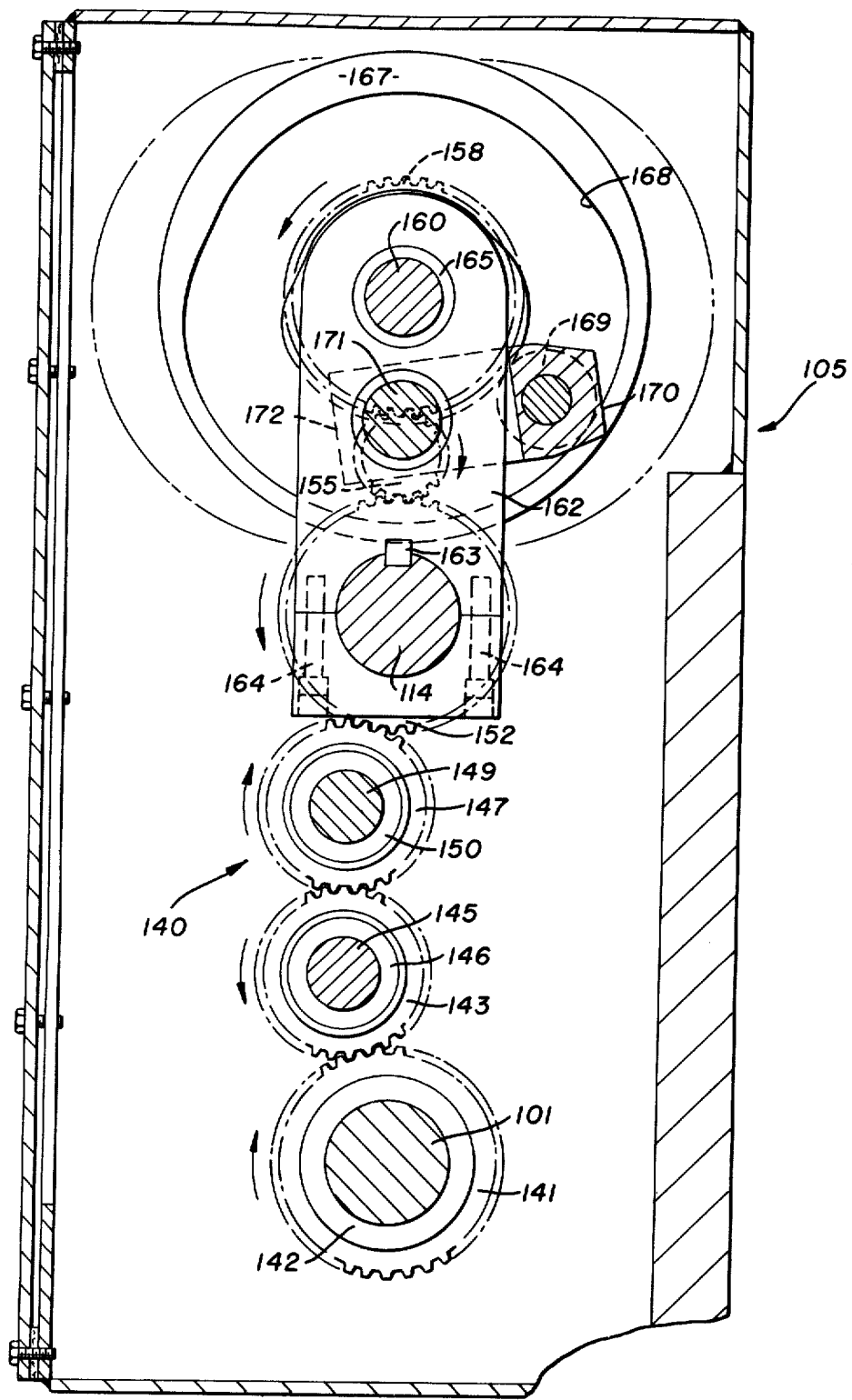
FIG. 6 is a sectional view taken substantially along line 6—6 of FIG. 5.

Spur gear 155 transfers motion to a final spur gear 158 of gear train 140, gear 158 being keyed to the rotatable secondary drive shaft 160. The operation of the gear train 140 is such that the shaft 160 rotates at the same speed as shaft 101 and in the direction of the arrow of FIG. 6, with gears 143, 147, 152 and 155 acting only as idler gears changing the direction as shown in FIG. 6 and transferring the motion at a one-to-one ratio. While these gears have been shown and described as spur gears, it should be evident that any type of motion transferring mechanism would be satisfactory.

Two oscillating brackets 161 and 162 are keyed to the rocker shaft 114, as at 163, and clamped thereto by bolts 164. Received through the upper portion of brackets 161 and 162 through bushings 165 is shaft 160. Thus, shaft 160 and the elements attached thereto reciprocate or oscillate with rocker shaft 114.

Affixed to shaft 160, as by taper lock bushings 166 is a finger actuating cam plate 167 having a cam channel 168 therein for receiving a cam follower roller 169. A throw arm 170 connects the cam follower roller 169 to a finger control shaft 171 which extends through oscillating bracket 162, being held in place by collars 172. It should thus be evident that shaft 171 not only oscillates with shaft 114 as shown in the phantom lines in FIG. 6, but also itself angularly reciprocates or rocks due to its connection with rotating cam plate 167.

Figure 12:
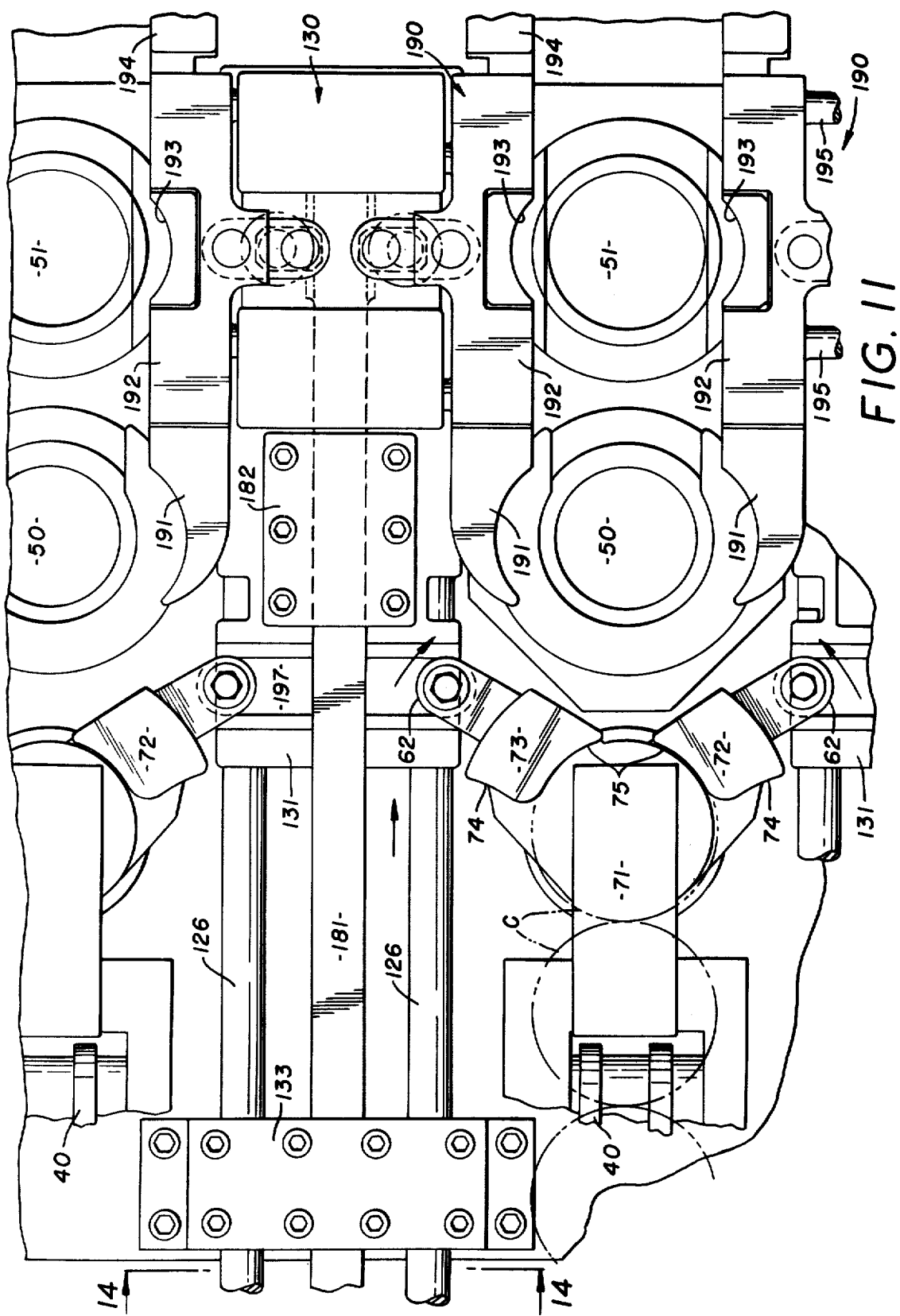
FIG. 12 is a sectional view taken substantially along line 12—12 of FIG. 10.

Finger control rocker shaft 171 extends slidably through the rocker arms 120 and is fixed to a plurality of finger control rocker or throw arms 173, there being one arm 173 for each pair of arms 120. As best shown in FIGS. 10a and 13a, a turnbuckle type linkage 174 is pinned to the clevis-like top 175 of each arm 173. Turnbuckle linkage 174 is likewise pinned, as at 176, to a clevis connection of clevis block 179, the base portion of which is attached, as by bolt 177, to support rod 178. Rod 178 also extends through bearing supports 133 and bearing structure 131. The clevis block also carries a finger actuating rack bar 181 which extends through the bearing support 133 and a further bearing guide 182. Rack bar 181 terminates with teeth 183 at both sides thereof (FIG. 10) which engage the pinion shafts 184. Eccentrically connected to pinion shafts 184, as by throw arms 185 (FIG. 12), are pins 186, each of which is mounted within one eyelet 187 of a double eyelet connector 188. The other eyelet 189 of each connector 188 is fixed to a can gripping finger mechanism indicated generally by the numeral 190.

Each can gripping finger mechanism 190 includes a hook-like portion 191 for grasping a cup C to be redrawn; a substantially flat body portion 192 having an arcuate recess 193 for gripping a can C which has been redrawn; and a pusher plate 194 for pushing the scraps of material from the trimming station 51. As previously described, the finger mechanisms 190 are attached to the shuttle 130 by the double eyelet connector 188, and are further supported by two rods 195 slidable in recesses 196 of shuttle 130 and connected to the body portion 192.

Figure 11:
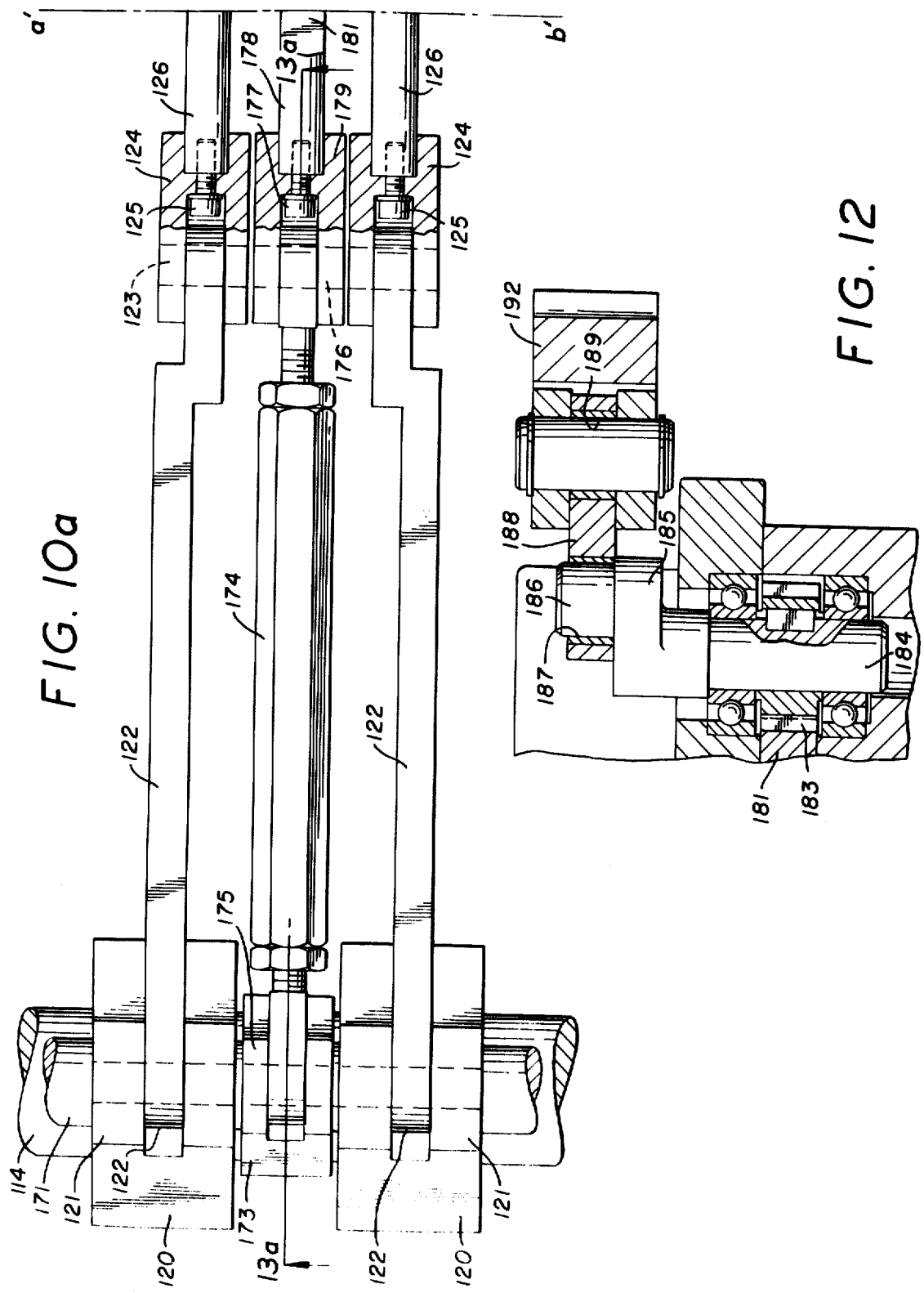
FIG. 11 is another enlarged top plan view, similar to FIG. 10, showing the transfer mechanism in a sequentially later position.

As should be evident from FIGS. 10 and 11, and the overall top plan view, FIG. 2, the finger mechanism 190 on each side of each shuttle 130 cooperates with the next adjacent finger mechanism 190 to completely grip the cans C. As the arms 173 rock to the end of the stroke as shown by the chain lines in FIGS. 13a and as dictated by cam 167, the rack bars 181 move in and out rotating pinions 184 to move the finger mechanisms 190 transversely to grip the cans C, the rods 195 sliding in recesses 196.

Figure 15:
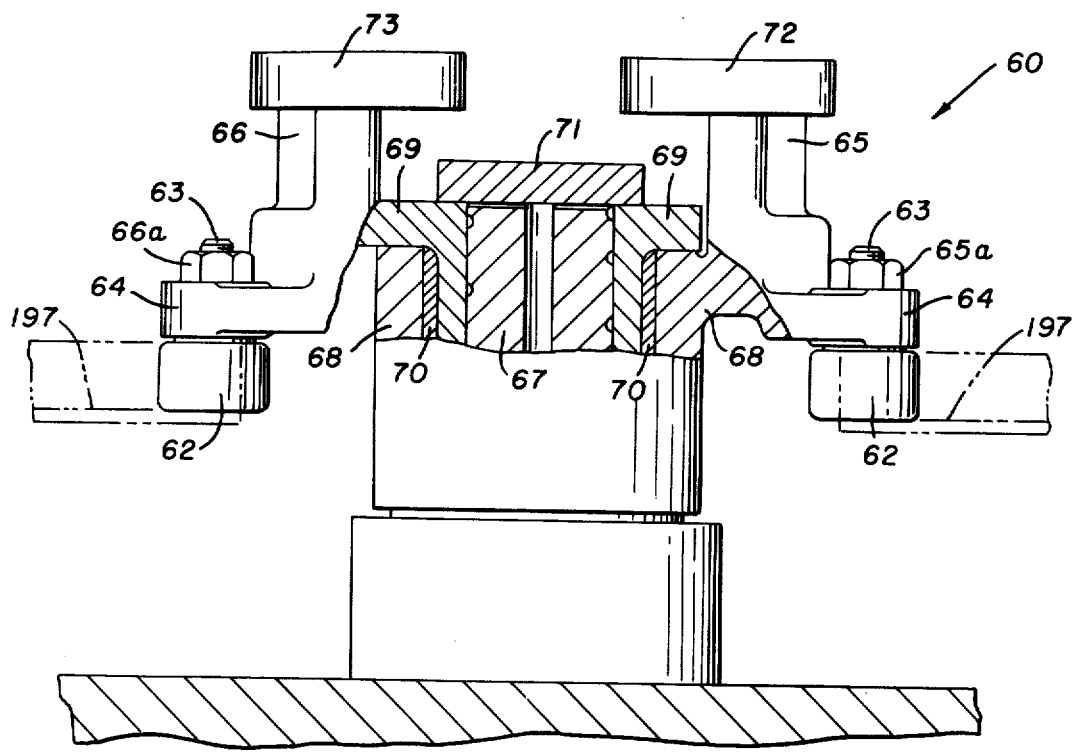
FIG. 15 is a sectional view taken substantially along line 15—15 of FIG. 10.

Each shuttle 130 is further provided with two slots 197 in which travel two rollers 62 from the escapement mechanisms 60 which hold the leading cup C at a pickup station to be received by the hook-like portions 191 of finger mechanisms 190. As best shown in FIGS. 10, 11 and 15, rollers 62 are journaled on axles 63 extending through outturned flanges 64 of arms 65 and 66, being held in place as by nuts 65a and 66a. An escapement spindle 67 is mounted to the press 20 and receives therearound the downturned collar-like flanges 68 and 69 of arms 65 and 66, respectively. A bushing 70 is received between collar flanges 68 and 69, allowing each to rotate independently on spindle 67. A table cap 71 is connected to the spindle 67 and holds the escapement arms 65 and 66 axially in place as well as providing a surface for the cups C to slide on as they pass from conveyors 40.

Arms 65 and 66 have escapement heads 72 and 73 attached thereto, respectively. As best shown in FIG. 10, heads 72 and 73 are contoured such that in the withdrawn position of shuttle 130 faces 74 cooperate to hold back the row of cups C to be redrawn, and faces 75 cooperate with the cup-holding device 61 (and at times hook portions 191) to hold the next cup to be conveyed to the press.

With the shuttle 130, the escapement mechanisms 60 and finger mechanisms 190 in the position of FIG. 10, the transfer mechanism 100 is at its most rearward position away from the press 20 with finger mechanisms 190 having been moved transversely outward with the hook portion 191 of two finger mechanisms of adjacent shuttles 130 gripping a cup C, with the recesses 193 of two adjoining finger mechanisms confining a can having been redrawn at station 50, and with the escapement mechanism 60 holding back the row of cups C, one being shown in chain lines.

From the point shown in FIG. 10, the rocker arms 120 begin to move the transfer mechanism inward due to the operation of cam plate 110. The position of cam follower roller 112 in channel 111 of plate 110 shown in FIG. 9 represents the approximate center of the inward stroke. The brackets 161 and 162 of FIGS. 5 and 6 are also shown at this midstroke position with cam follower roller 169 in channel 168 of the finger actuating cam plate 167 also being shown in solid lines in FIG. 6 in the corresponding gripping position. The chain lines in FIG. 6 depict the position of cam plate 167 at the two extremes of the rocking motion of shaft 114 and its associated members.

FIG. 11 shows the shuttle 130 of transfer mechanism 100 at its innermost position with the finger mechanisms 190 now being retracted and ready to return and begin the cycle anew. As the shuttle 130 is moved from the FIG. 10 to the FIG. 11 position the rollers 62 of escapement 60 move inwardly in slot 197 and the arms 65 and 66 rotate on spindle 67 in the direction of the arrows in FIG. 11 until at the innermost point of the shuttle travel (FIG. 11), surfaces 75 of heads 72 and 73 are restraining the line of cups C. As the shuttle 130 then moves back to the FIG. 10 position, the escapement arms 65 and 66 again rotate on spindle 67 around the first cup C at the same time the cup C is being restrained by the cup holding device 61 (the press head 55 having been lowered) and the approaching hook portions 191 of fingers 190.

Referring to FIGS. 1 and 2, it should be remembered that a press 20 with capabilities of receiving 10 rows of cans, five from each side of the press, has been described along with the necessary number of transfer mechanisms 100 and the associated devices. The mechanisms described above were those on the right hand side of FIG. 1, it being understood that the mechanisms on the left hand side of FIG. 1 are substantially similar with one major exception. The gear box 105 receives its power from shaft 28 through chain 35 to shaft 101. Shaft 101, therefore, rotates in a clockwise direction as shown by the arrows in FIG. 6. The gear box 105, through gear train 140 transfers this motion to shaft 114 which properly rotates in a counterclockwise direction, that is, away from the press 20. In order to create a similar motion on the other side of press 20, gear box 205 is slightly different than gear box 105 in that box 205 need have one less intermediate gear to effect the same motion.

Figure 7:
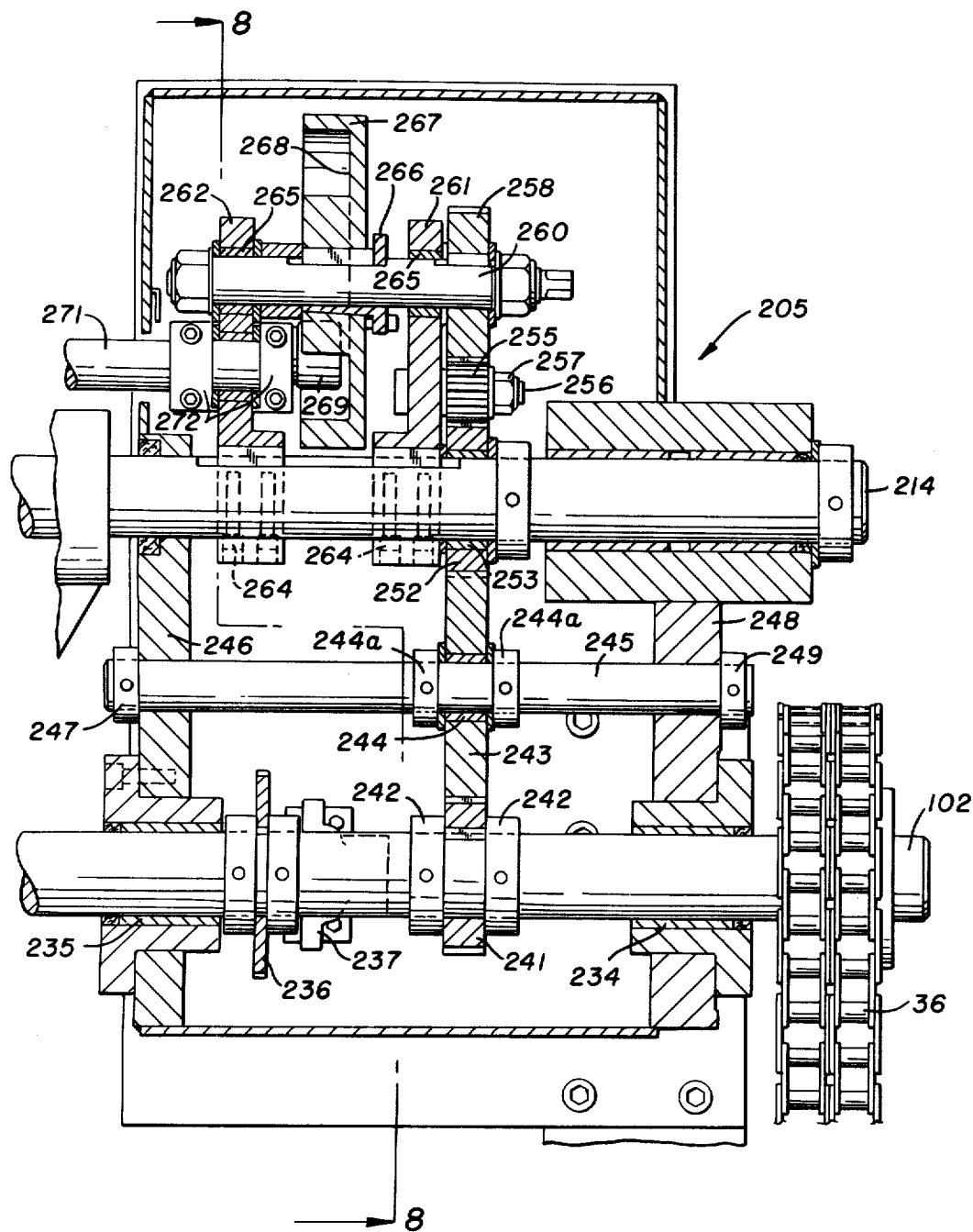
FIG. 7 is a sectional view taken substantially along line 7—7 of FIG. 1.

As best shown in FIG. 7, shaft 102 is driven by chain 36 and extends through gear box 205, being structurally supported by bushings 234 and 235. Shaft 102 drives an oil pump gear 236 which operates an oil pump 237 in a standard manner to provide an oil bath for the gear train indicated generally by the numeral 240, shown in more detail in FIG. 8.

A spur gear 241 is keyed to shaft 102 and confined in place by collars 242. Gear 241 meshes with an intermediate spur gear 243 which rides on bushing 244 on fixed stub shaft 245, being held in place by collar and washer assemblies 244a. Shaft 245 is fixed at one side to a support plate 246, being held in place by collar 247 and fixed on the other side to plate 248 of housing 205, being held in place by collar 249. Comparing FIGS. 5 and 6 with FIGS. 7 and 8 makes it clear that the shaft 245 and gear 243 replace shafts 145 and 149 and gears 143 and 147 of gear train 140, this being the difference between gear train 140 and gear train 240.

Figure 8:
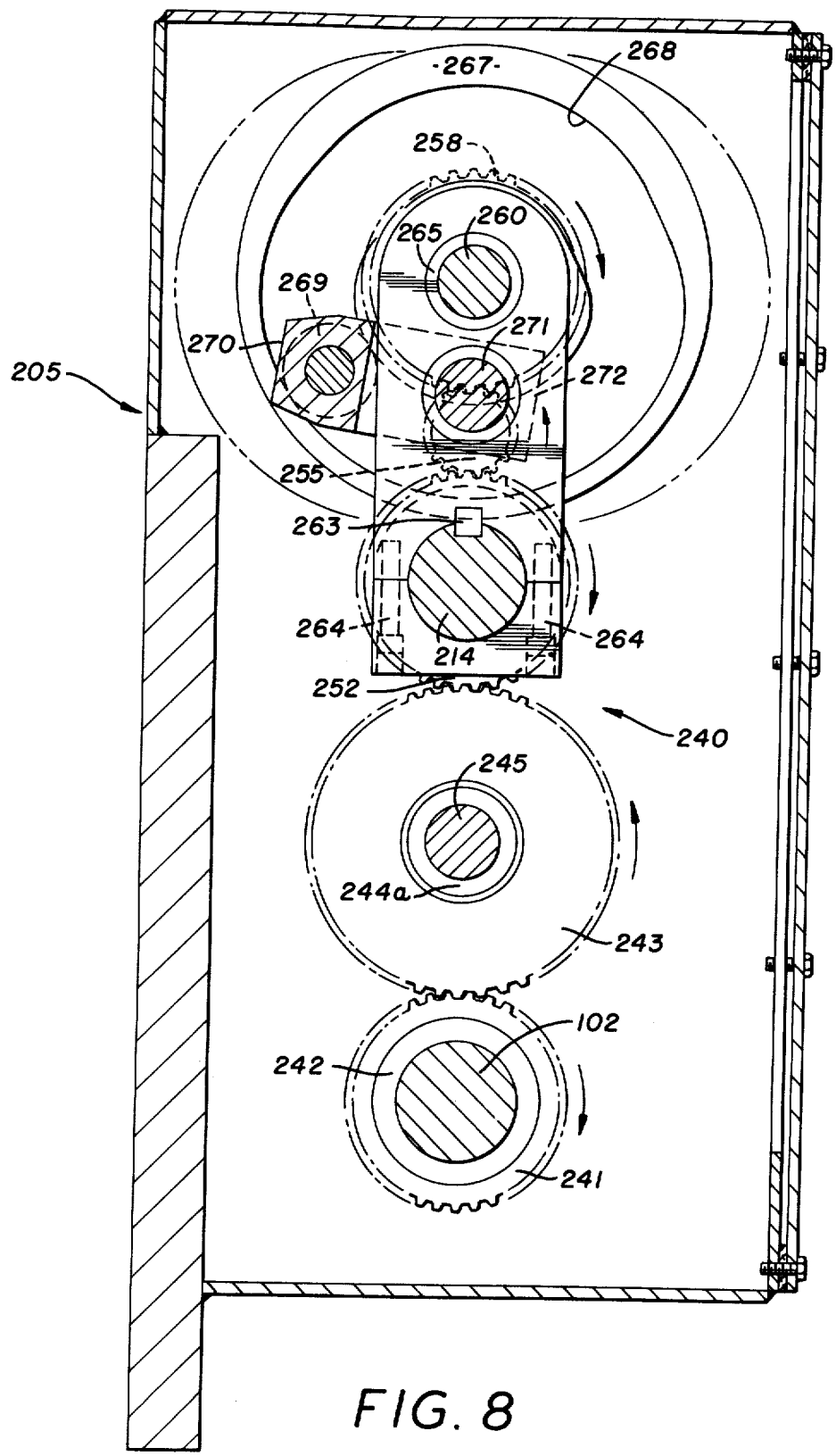
FIG. 8 is a sectional view taken substantially along line 8—8 of FIG. 7.

Another intermediate spur gear 252 extends around the rocker shaft 214, which controls the lateral movement of the transfer mechanisms 100 on the left hand side of the press 20, as shown in FIG. 1, and rides on bushing 253. Spur gear 252 transfers motion from gear 243 to a further intermediate spur gear 255 mounted on axle 256 and held in place as by nut 257. Spur gear 255 transfers motion to a final spur gear 258 of gear train 240 being keyed to the rotatable secondary drive shaft 260. The operation of gear train 240 is such that the shaft 260 rotates at the same speed as shaft 102 with gears 243, 252 and 255 acting only as idler gears changing the direction as shown in FIG. 8 and transferring the motion at one-to-one ratio.

As was the case in gear box 105, two reciprocating brackets 261 and 262 are keyed to rocker shaft 214, as at 263, and clamped thereto by bolts 264. Received through bushings 265 at the upper portion of brackets 261 and 262 is shaft 260. Thus, shaft 260 and the elements attached thereto reciprocate with rocker shaft 214.

Affixed to shaft 260, as by taper lock bushings 266, is a finger actuating cam plate 267 having a cam channel 268 therein for receiving a cam follower roller 269. A throw arm 270 connects cam follower roller 269 to a finger control shaft 271 which extends through reciprocating bracket 262, being held in place by collars 272. It should thus be evident that shaft 271 not only reciprocates with shaft 214, as shown in the phantom lines in FIG. 8, but also itself angularly reciprocates or rocks due to its connection with rotating cam plate 267 and thereby controls the transverse position of the finger mechanisms 190 on the left hand side of the press 20 shown in FIG. 1 in an identical manner to that previously described in conjunction with shaft 171.

It should now be clear that a transfer mechanism constructed as described herein is capable of speedy operation independently of, but coordinated with, the work operation of a redraw press or other machine and otherwise improves the transfer mechanism and redraw press art and accomplishes the objects hereinabove stated.

We claim:

1. In a redraw press receiving at least one row of continuously fed cups to be redrawn and trimmed into a finished can, a first station for drawing the cups into cans upon the downward movement of the press, a second station for trimming the cans upon the same downward movement of the press, escapement means for each row of cups placing one of the continuously fed cups into position to be transferred to said first station, and transfer means for simultaneously transferring a cup from said escapement means to said first station and a can from said first station to said second station, said transfer means including a rotatably powered drive shaft, shuttle means, finger mechanisms carried by said shuttle means, first rocker means activated by said drive shaft for reciprocating said shuttle means into and out of said press, and second rocker means rocking with said first rocker means as well as rocking independently of said first rocker means for moving said finger mechanism transversely of said shuttle means to selectively grip and release the cups and cans.

2. A redraw press according to claim 1 having two said shuttle means operating on each row of continuously fed cups, said finger mechanisms of adjacent shuttle means cooperating to selectively grip and release the cups and cans.

3. A redraw press according to claim 1 receiving at least two rows of continuously fed cups and having at least three said shuttle means, one said shuttle means on each side of a row, said finger mechanisms of adjacent shuttle means cooperating to selectively grip and release the cups and cans.

4. A redraw press according to claim 1, said first rocker means including a first rocker shaft, first rocker arm means on said first rocker shaft, and means connecting said rocker arm means to said shuttle means to provide the lateral movement of said shuttle means.

5. A redraw press according to claim 4, said first rocker means further including a first cam connected to said drive shaft, first cam follower means riding said first cam, said first cam follower means being operatively connected to said first rocker shaft to angularly reciprocate said first rocker shaft.

6. A redraw press according to claim 5, said second rocker means including a second rocker shaft, second rocker arm means on said second rocker shaft, and rack and pinion means operatively connecting said second rocker shaft to said finger mechanisms to move said finger mechanisms transversely.

7. In a redraw press receiving at least one row of continuously fed cups to be redrawn and trimmed into a finished can, a first station for drawing the cups into cans upon the downward movement of the press, a second station for trimming the cans upon the same downward movement of the press, escapement means for each row of cups placing one of the continuously fed cups into position to be transferred to said first station, and transfer means for simultaneously transferring a cup from said escapement means to said first station and a can from said first station to said second station, operating independently of but coordinated with the downward movement of the press including shuttle means movably laterally inwardly and outwardly of said press, finger mechanisms carried by said shuttle means and movable transversely of the lateral movement of said shuttle means to selectively grip and release the cups and cans, a first rocker shaft, first rocker arm means on said first rocker shaft, means connecting said rocker arm means to said shuttle means to provide the lateral movement of said shuttle means, rotatable drive shaft, a first cam connected to said drive shaft, first cam follower means riding said cam, said first cam follower means being operatively connected to said first rocker shaft to angularly reciprocate said first rocker shaft, a second rocker shaft, second rocker arm means on said second rocker shaft, rack and pinion means operatively connecting said second rocker shaft to said finger mechanisms transversely, a gear train transferring the motion of said drive shaft to a secondary drive shaft, a second cam connected to said secondary drive shaft, second cam follower means riding said second cam, said second cam follower means being operatively connected to said second rocker shaft to angularly reciprocate said second rocker shaft.

8. A redraw press according to claim 7 wherein said second rocker shaft extends slidably through said first rocker arm means and said secondary drive shaft oscillates with respect to said first rocker shaft.

9. A redraw press according to claim 1, including a scrap removing conveyor proximate said second station, said finger mechanisms including pusher means to displace scraps of trimmed material from said second station to said scrap removing conveyor.

10. A redraw press according to claim 1 wherein said escapement means is operatively connected to said shuttle means so that when said shuttle means moves laterally inward the row of cups is restrained and when said shuttle means moves laterally outward a new cup is placed into position to be gripped by said finger mechanisms.

11. A redraw press according to claim 1 including a cup holding device activated upon the downward movement of the press and cooperating with said escapement means to place a cup into position to be transferred to said first station.

12. A redraw press according to claim 1 including means to remove the cans from said second station operative during the downward movement of the press.

13. A redraw press according to claim 1, each said finger mechanism including a hook portion for gripping a cup, a recessed body portion for gripping a can at said first station, and a pusher means for removing scrap from said second station.

* * * * *